United States Patent [19]

Chen

[11] Patent Number: 5,722,697
[45] Date of Patent: Mar. 3, 1998

[54] FITTING WITH TWO TUBULAR MEMBERS ROTATABLE RELATIVE TO EACH OTHER

[76] Inventor: Waterson Chen, No. 477, Kuo-Kang Rd., Taichung City, Taiwan

[21] Appl. No.: 632,379

[22] Filed: Apr. 10, 1996

[51] Int. Cl.⁶ .................................................. F16L 55/00
[52] U.S. Cl. .................. 285/91; 285/276; 285/312; 285/321; 285/328
[58] Field of Search .................. 285/81, 91, 276, 285/278, 280, 281, 321, 305, 330, 332, 328, 312

[56] References Cited

U.S. PATENT DOCUMENTS

| | | | |
|---|---|---|---|
| 3,314,696 | 4/1967 | Ferguson et al. | 285/276 X |
| 4,548,427 | 10/1985 | Press et al. | 285/321 X |
| 4,872,710 | 10/1989 | Konecny et al. | 285/81 |
| 4,884,829 | 12/1989 | Funk et al. | 285/81 X |
| 5,295,717 | 3/1994 | Chen . | |

FOREIGN PATENT DOCUMENTS 493761 10/1938 United Kingdom ............... 285/91

*Primary Examiner*—Terry Lee Melius
*Assistant Examiner*—Heather Shackelford
*Attorney, Agent, or Firm*—Kenyon & Kenyon

[57] ABSTRACT

A fitting is adapted to connect two hoses and includes first and second tubular members which include interconnecting end portions that enable the tubular members to be rotated relative to each other. The first tubular member includes a receiving end portion which receives an insert end portion of the second tubular member. An arrangement of flanges on the respective end portions of the tubular members defines cooperating grooves which receive a C-shaped retaining ring. When two hoses connected by the fitting are twisted relative to each other, the twisted hoses can be straightened by relative rotation of the first and second tubular members, thereby permitting smooth flow of fluid through the fitting.

3 Claims, 5 Drawing Sheets

FITTING WITH TWO TUBULAR MEMBERS ROTATABLE RELATIVE TO EACH OTHER

BACKGROUND OF THE INVENTION

1. Field of the Invention

The invention relates to a fitting, more particularly to a fitting with two tubular members which are rotatable relative to each other.

2. Description of the Related Art

Referring to FIG. 1, a conventional fitting is shown to include a one-piece tubular member 10 having a first tubular portion 101 adapted to be connected to a first hose (P) in use, and a second tubular portion 102 which extends integrally and axially from the first tubular portion 101 and which is adapted to be connected threadedly to a second hose (Q) in use so as to permit passage of a fluid through the conventional fitting. The conventional fitting further includes a pair of press arms 12 each of which is mounted pivotally to the pivot ears 13 of the first tubular portion 101 near a respective one of the radial openings 1011 formed through the first tubular portion 101. Each of the press arms 12 has a cam face and is pivotable to a locking position in which the cam face extends into the respective radial opening 1011 and presses against an external surface of the first hose (P), thereby securing the hose (P) in the first tubular portion 101 of the conventional fitting.

Because the tubular member 10 cannot be idly rotated relative to the hoses (P, Q), in the event either of the hoses (P, Q) is twisted relative to the one-piece tubular member 10, flow speed of fluid is partially and even wholly hindered in the conventional fitting.

SUMMARY OF THE INVENTION

An object of this invention is to provide a fitting which includes two tubular members rotatable relative thereto.

Another object of this invention is to provide a fitting including two tubular members which can be easily interconnected.

Accordingly, a fitting of this invention includes first and second tubular members which are connected rotatably to each other. In case two hoses are connected to the first and second tubular members respectively and are twisted relative to each other, the twisted hose can be straightened by relative rotation of the first and second tubular members, thereby permitting smooth flow of fluid through the fitting.

BRIEF DESCRIPTION OF THE DRAWINGS

Other features and advantages of this invention will become more apparent in the following detailed description of the preferred embodiment, with reference to the accompanying drawings, in which.

DETAILED DESCRIPTION OF THE PREFERRED EMBODIMENT

Figure 1:
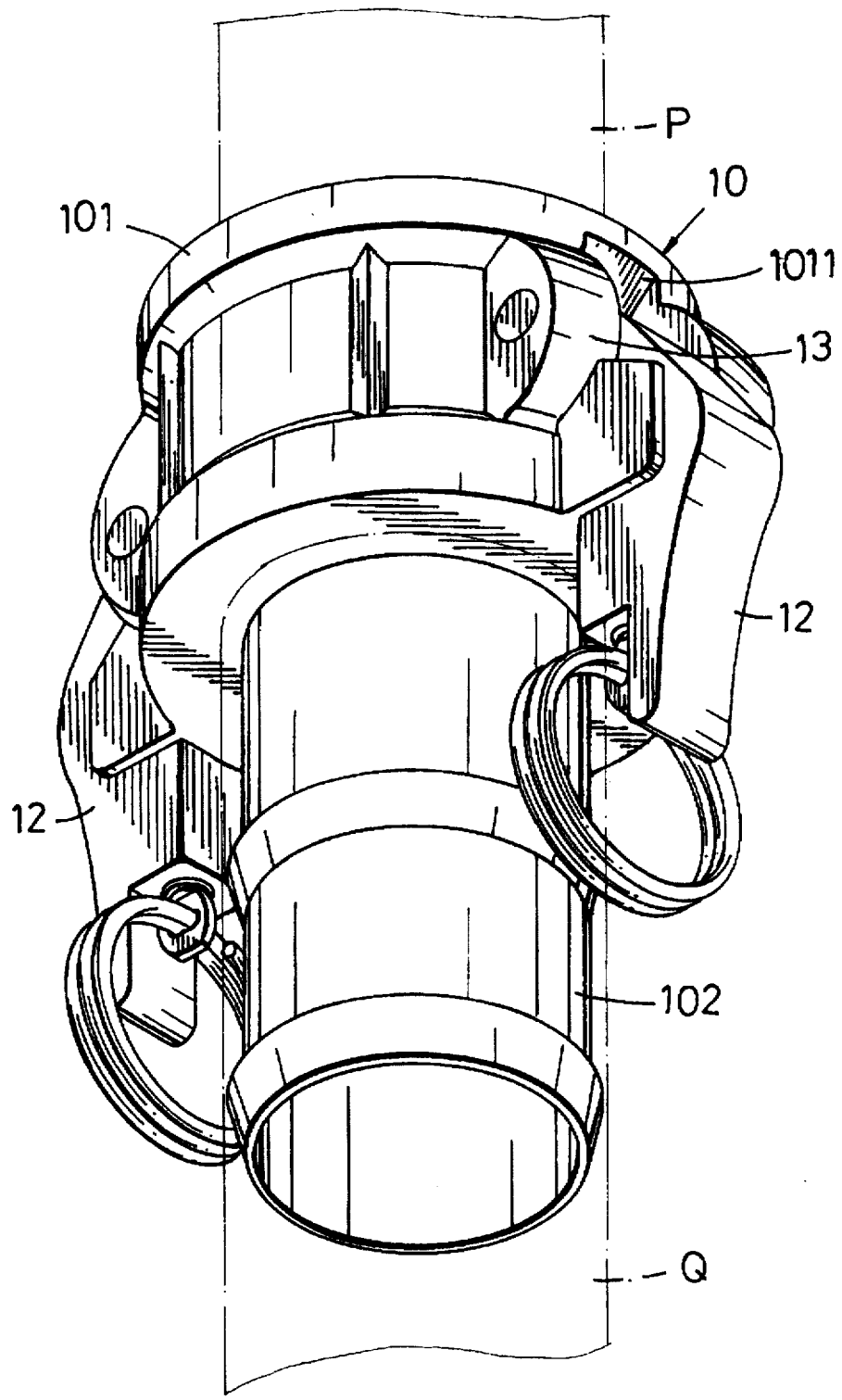
FIG. 1 shows a conventional fitting in use.
Figure 2:
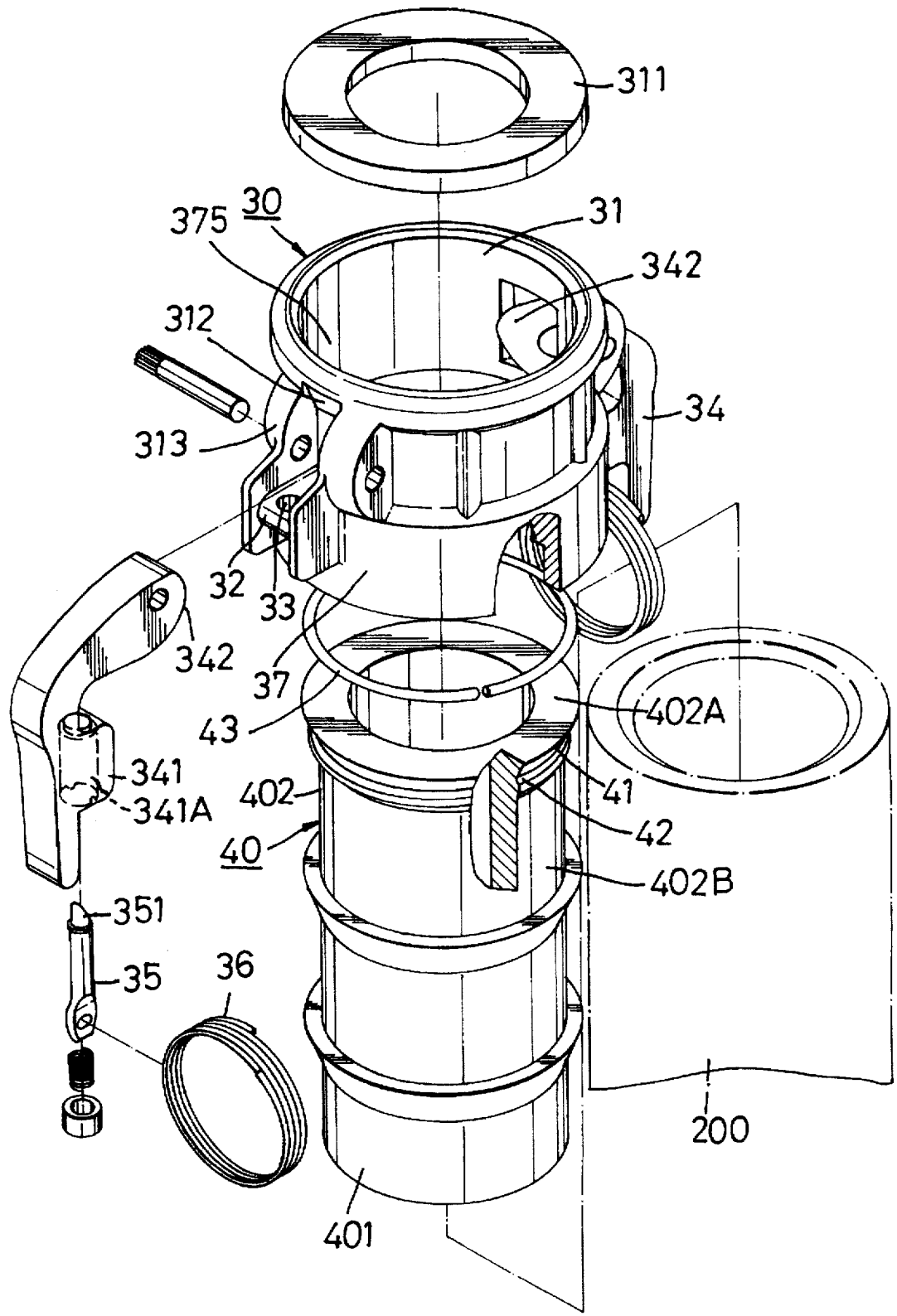
FIG. 2 is an exploded view of a fitting of this invention.
Figure 3:
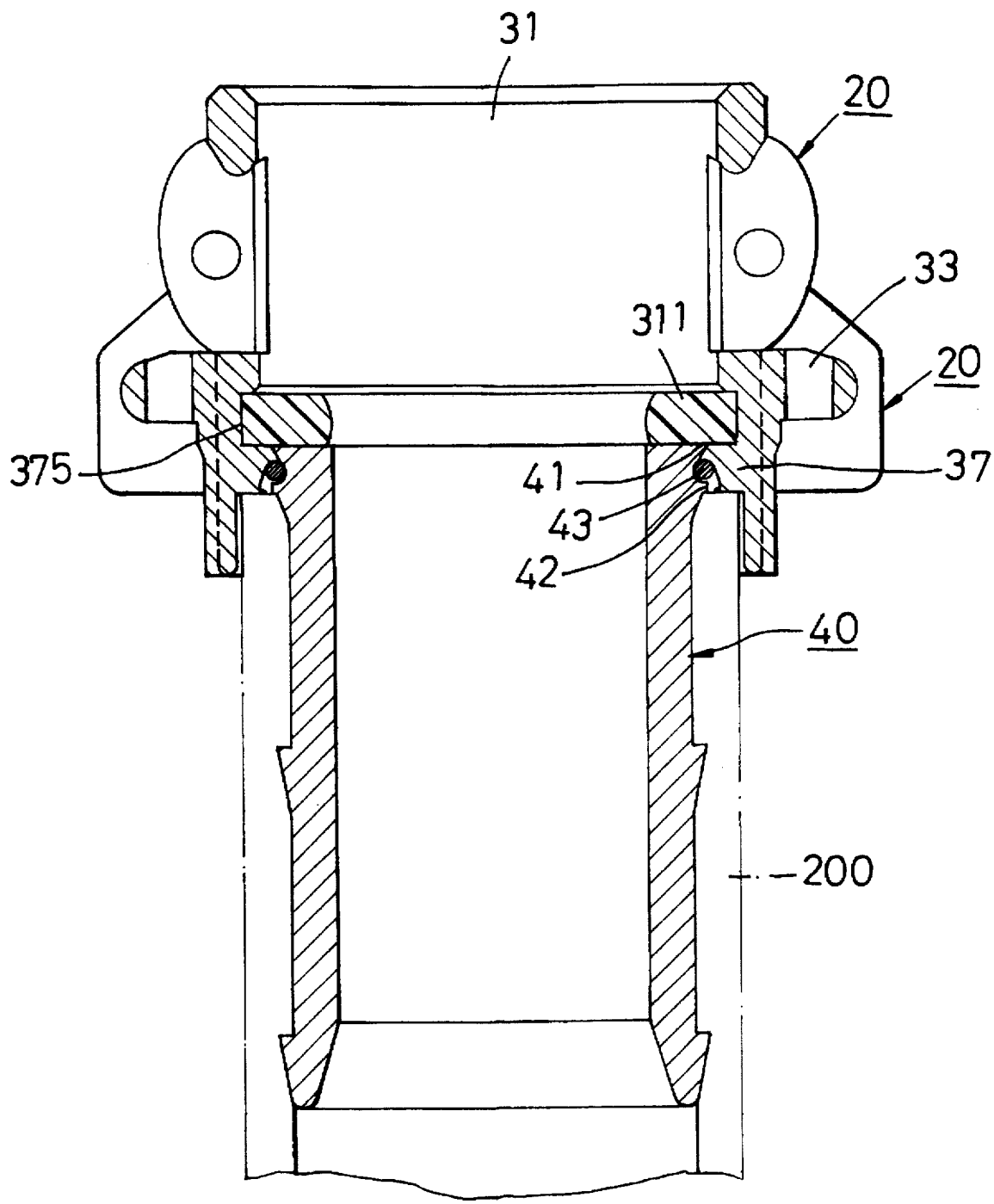
FIG. 3 is a sectional view of the fitting of this invention.
Figure 4:
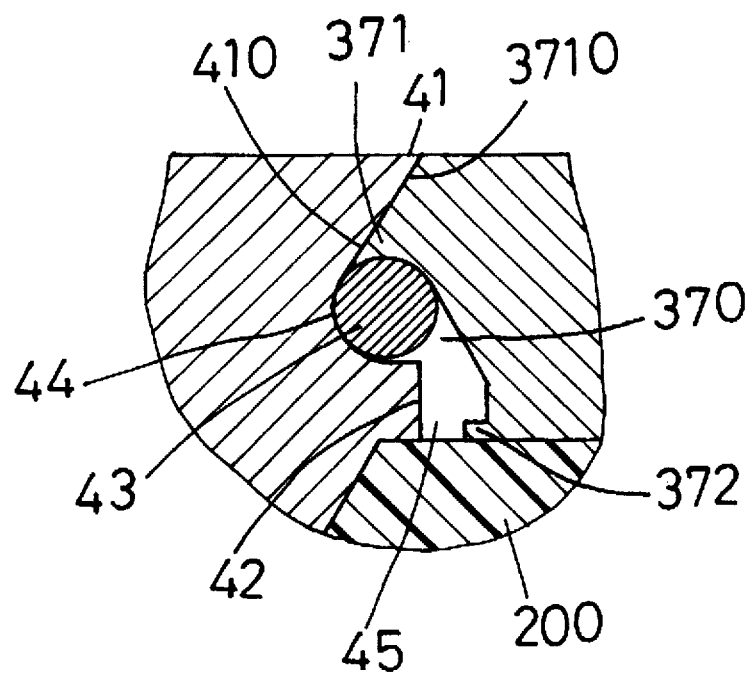
FIG. 4 is a schematic view illustrating engagement of two tubular members of the fitting according to this invention.

Referring to FIGS. 2, 3 and 4, a fitting of this invention includes a first tubular member 30, a second tubular member 40, an annular seal ring 311, and a pair of press arms 34.

As illustrated, the first tubular member 30 has a connecting end portion 31, and a receiving end portion 37 having an inner peripheral surface which is formed with a first inward flange 371 and a second inward flange 372 that project therefrom. The first and second inward flanges 371, 372 are adjacent to each other so as to cooperatively define an annular first small groove 370 therebetween. The inner peripheral surface of the receiving end portion 37 further has an annular large groove 375 formed therein near the first inward flange 371 in such a manner that the first inward flange 371 is located between the second inward flange 372 and the large groove 375. The first inward flange 371 defines the smallest inner diameter of the first tubular member 30 thereat. The second inward flange 372 defines a large inner diameter of the first tubular member 30 thereat which is larger than the smallest inner diameter.

The second member 40 has an engaging end portion 401 adapted to be connected to a first hose 200 in use, and an insert end portion 402 which extends into the receiving end portion 37 of the first tubular member 30 and which has an annular flat end face 402A, and an outer peripheral surface 402B formed with a first outward flange 41 and a second outward flange 42 that project therefrom. The first and second outward flanges 41, 42 are adjacent to each other and define cooperatively an annular second small groove 44 therebetween. The first outward flange 41 defines the largest outer diameter of the second tubular member 40 thereat which is larger than the smallest inner diameter of the first tubular member 30. The second outward flange 42 defines a small outer diameter of the second tubular member 40 thereat which is larger than the smallest inner diameter of the first tubular member 30 and than the largest outer diameter of the second tubular member 40, a gap 45 being located between the second inward but smaller outward flanges 372, 42. The first inward flange 371 is located between the first and second outward flanges 41, 42. The first inward and outward flanges 371, 41 have inclined surfaces 3710, 410 which engage each other so as to enable the first inward flange 371 to move into a space between the first and second outward flanges 41, 42 of the second tubular member 40 during assembly of the members 30, 40.

The rubber seal ring 311 is received within the large groove 375 of the first tubular member 30 and presses against the annular end surface 402A of the second tubular member 40 so as to establish a liquid-tight seal between the inclined surfaces 3710, 410 of the first inward and outward flanges 371, 41.

A C-shaped retaining ring 43 of stainless steel is received within the first and second small grooves 370, 44 of the first and second tubular members 30, 40 and has a diameter larger than the gap 45 which is defined between the second inward and outward flanges 372, 42 so as to retain the first and second tubular members 30, 40 together and so as to prevent removal of the ring 43 from the first and second small grooves 370, 44 of the first and second tubular members 30, 40.

The connecting end portion 31 of the first tubular member 30 has two opposite radial openings 312 formed through a wall thereof. Each of the press arms 34 is mounted pivotally on the pivot ears 313 of the first tubular member 30 adjacent to the respective radial opening 312. Each of the press arms 34 further has a positioning seat 341 formed with an axial positioning bore 341A therethrough, and a spring-loaded retaining bolt 35 disposed in the positioning bore 341A of the seat 341.

Figure 5:
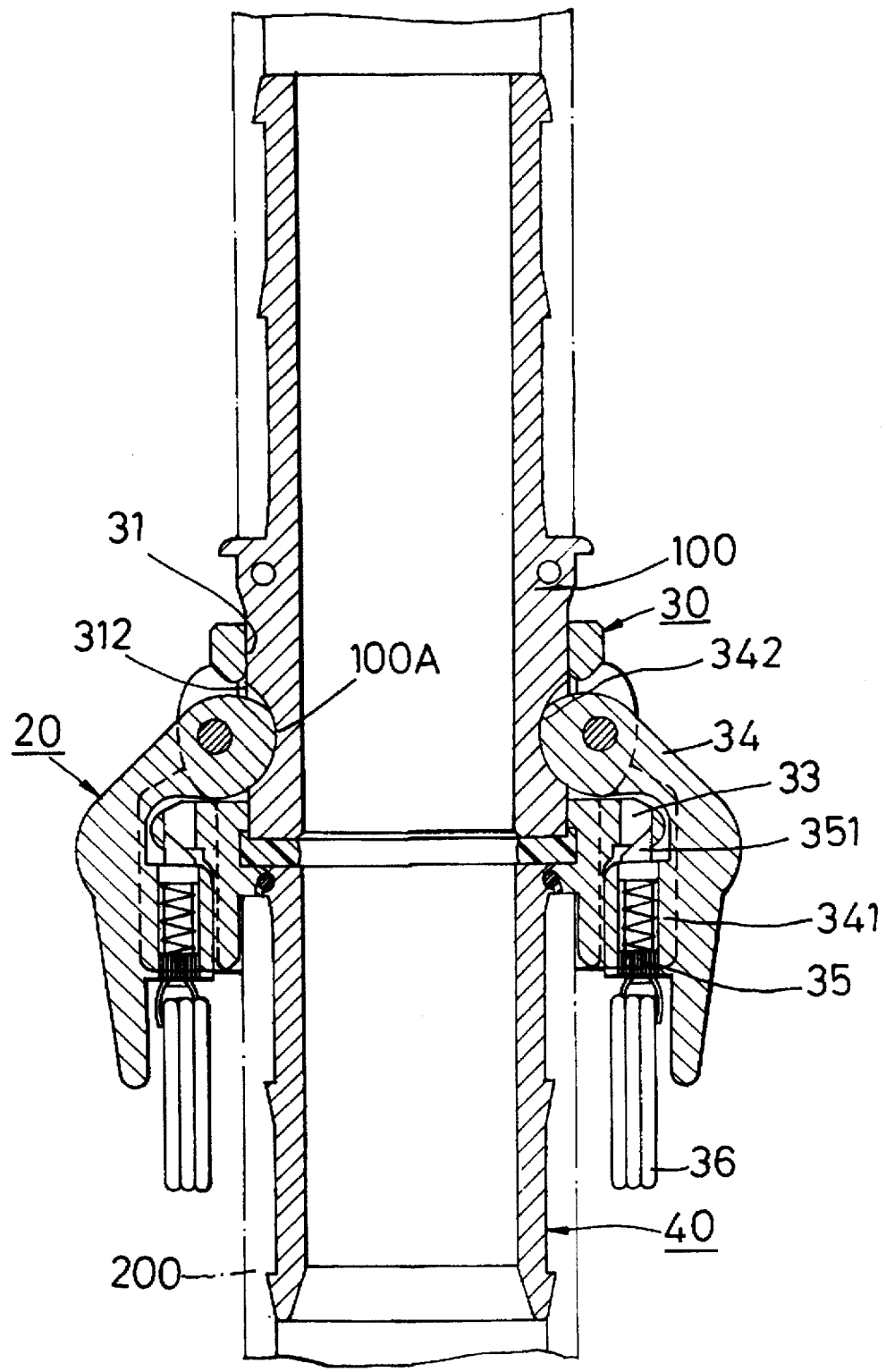
FIG. 5 is a sectional view of the fitting of this invention in use.

Referring to FIG. 5, in use, after threadedly connecting the first hose 200 to the engaging end portion of the second tubular member 40, a second hose 100 is inserted into the connecting end portion 31 of the first tubular member 30. The press arms 34 are pressed onto the second tubular member 40 so as to be in the locking position such that the cam faces 342 of the press arms 34 extend through the radial openings 312 so as to engage within an outer peripheral groove 100A of the hose 100. Under this condition, the distal ends 351 of the retaining latches 35 extends into the holes 33 of the plates 32 interconnecting the ears 313 (see FIG. 2), thereby locking the hose 100 in the first tubular member 30. The latches 35 are provided with two pull rings 36 respectively so that outward pull of the rings 36 permits the press arms 34 to be pivoted to the unlocking positions.

Because the hose 100 is inserted into the first tubular member 30 so that when flowing through the connector of this invention, the fluid does not contact with the first tubular member 30. Thus, the first tubular member 30 can be made from a cheap material, such as cast iron, while the second tubular member 40 can be made from stainless steel so as to reduce manufacturing cost of the fitting of this invention.

In the event either one of the hoses 100, 200 is twisted, thereby hindering or blocking flow of fluid through the fitting, the first and second tubular members 30, 40 can be rotated relative to each other so as to straighten the twisted portion of the hoses 100, 200 and so as to permit flow of fluid through the first and second tubular member 100, 200.

With this invention thus explained, it is obvious to those skilled in the art that various modifications and variations can be made without departing from the scope and spirit thereof. Therefore, this invention is intended to be limited only as in the appended claims.

I claim:

1. A fitting including a first tubular member and a second tubular member coupled with the first tubular member, wherein the improvements comprise:

said first and second tubular members being formed separately, said first tubular member having a connecting end portion adapted to be connected to a first hose in use, and a receiving end portion having an inner peripheral surface formed with a first inward flange and a second inward flange projecting therefrom which are adjacent to each other so as to cooperatively define an annular first small groove therebetween, said inner peripheral surface of said receiving end portion further having an annular large groove formed therein near said first inward flange in such a manner that said first inward flange is located between said second inward flange and said large groove, said first inward flange defining the smallest inner diameter of said first tubular member thereat, said second inward flange defining a large inner diameter of said first tubular member thereat which is larger than the smallest inner diameter;

said second member having an engaging end portion adapted to be connected to a second hose in use, and an insert end portion extending into said receiving end portion of said first tubular member and having an annular flat end face, and an outer peripheral surface formed with a first outward flange and a second outward flange projecting therefrom which are adjacent to each other and which define cooperatively an annular second small groove therebetween, said first outward flange defining the largest outer diameter of said second tubular member thereat which is larger than the smallest inner diameter of said first tubular member, said second outer flange defining a small outer diameter of said second tubular member thereat which is larger than the smallest inner diameter of said first tubular member but smaller than the largest outer diameter of said second tubular member, a gap being located between said second inward and outward flanges, said first inward flange being located between said first and second outward flanges, said first inward and outward flanges having inclined surfaces which engage each other so as to enable said first inward flange to move into a space between said first and second outward flanges during assembly of said first and second tubular members;

a seal ring received within said large groove of said first tubular member and pressing against said annular end surface of said second tubular member so as to establish a liquid-tight seal between said inclined surfaces of said first inward and outward flanges; and a C-shaped retaining ring received with said first and second small grooves and having a diameter larger than the gap so as to retain said first and second tubular members together and so as to prevent removal of said retaining ring from said first and second small grooves.

2. The fitting as defined in claim 1, wherein said connecting end portion of said first tubular member has a radial opening formed through a wall thereof, said connector further including a press arm which is mounted pivotally on said first tubular member, said press arm extending through the said radial opening and having a cam face which is adapted to press against an external surface of said first hose so as to secure said first hose in the first tubular member.

3. The fitting as defined in claim 1, wherein said first tubular member is made from cast iron, said second tubular member being made from stainless steel so as to reduce manufacturing cost of said fitting.

\* \* \* \* \*